United States Patent
Collins et al.

(10) Patent No.: US 9,352,982 B2
(45) Date of Patent: May 31, 2016

(54) METHODS OF REMOVING SMECTITE CLAY FROM WATER USING WOLLASTONITE

(71) Applicants: Warde Collins, Boyne City, MI (US); Michael Wolgast, Clio, MI (US)

(72) Inventors: Warde Collins, Boyne City, MI (US); Michael Wolgast, Clio, MI (US)

( * ) Notice: Subject to any disclaimer, the term of this patent is extended or adjusted under 35 U.S.C. 154(b) by 159 days.

(21) Appl. No.: 14/318,995

(22) Filed: Jun. 30, 2014

(65) Prior Publication Data

US 2015/0001152 A1 Jan. 1, 2015

Related U.S. Application Data

(60) Provisional application No. 61/841,457, filed on Jul. 1, 2013.

(51) Int. Cl.
 *C02F 1/28* (2006.01)
 *C02F 101/20* (2006.01)
 *C02F 101/10* (2006.01)

(52) U.S. Cl.
 CPC .............. *C02F 1/281* (2013.01); *C02F 1/286* (2013.01); *C02F 1/285* (2013.01); *C02F 2101/10* (2013.01); *C02F 2101/20* (2013.01)

(58) Field of Classification Search
 CPC ....... C02F 1/281; C02F 1/286; C02F 2101/20
 See application file for complete search history.

(56) References Cited

U.S. PATENT DOCUMENTS

| | | | |
|---|---|---|---|
| 2009/0045136 A1* | 2/2009 | Hellingwerf | B01J 20/041 210/682 |
| 2009/0274634 A1 | 11/2009 | Collins et al. | |

\* cited by examiner

*Primary Examiner* — Matthew O Savage

(57) ABSTRACT

Methods of removing smectite clay from water using Wollastonite and a method of removing toxic materials from the Wollastonite treated water. In addition, the method comprises removing toxic materials from water using only the Wollastonite.

4 Claims, No Drawings

METHODS OF REMOVING SMECTITE CLAY FROM WATER USING WOLLASTONITE

BACKGROUND OF THE INVENTION

This application deals with a method of removing smectite clay from water. The need for removing the clay from water derives from attempts to remove mercury and other toxic materials from waste water.

There are methods published for removing toxic materials from waste water, for example, U.S. patent application Ser. No. 12/151,242, that was filed on May 5, 2008 in the name of Collins, et. al. which describes a novel polymeric material that is used for such removal.

This novel polymeric material is exceptionally good at removing toxic materials, but the method is carried out using flow through filters wherein the filter sequestering material is the polymeric material. Smectite clays are abundant in water, especially in certain parts of the United States. The smectite clays in the waste water tend to plug up the beds of the polymeric material and it would be advantageous to remove the clay from the water before it is introduced to the polymeric material.

It now has been discovered that Wollastonite is especially good for removing smectite clays from water. Wollastonite is a calcium inosilicate mineral ($CaSiO_3$) that contains small amounts of iron, magnesium and manganese substituting for calcium. Wollastonite is traditionally used primarily in ceramics, friction products such as brakes and clutches, metal making, paint fillers, and plastics.

It has also been discovered that Wollastonite is capable of removing mercury and other toxic materials from water.

Applicant is not aware of any prior art or use using Wollastonite for this purpose.

THE INVENTION

What is disclosed and claimed herein as a first embodiment is a method of removing smectite clay from water, the method comprising providing a vessel containing Wollastonite, and contacting water containing smectite clay with the Wollastonite.

In a second embodiment, there is a method of removing smectite clay from water, the method comprising mixing water containing a predetermined amount of smectite clay with a predetermined amount of Wollastonite and filtering the mixture to remove the smectite clay and the Wollastonite.

A third embodiment is a method of removing toxic materials from water, wherein the method comprises providing a flow through vessel packed with a polymeric sequestering material and providing a flow through vessel packed with Wollastonite.

Thereafter, flowing the water containing toxic materials through the Wollastonite flow through vessel and then, flowing the Wollastonite treated water containing the toxic materials through the polymeric sequestering material.

Yet another embodiment is a method of removing toxic materials from water, wherein the method comprises mixing water containing toxic materials with a predetermined amount of Wollastonite and filtering the Wollastonite from the water.

Thereafter, providing a flow through vessel packed with a polymeric sequestering material and flowing the water from the Wollastonite treatment through the polymeric sequestering material.

DETAILED DESCRIPTION OF THE INVENTION

Smectite clay, in water, is normally a stable colloidal dispersed particle which is very difficult to remove by filtration. The clay is a common ingredient in the water and is capable of passing through normal filters at water processing plants.

The difficulty of removing smectite clay is described in the publication "Clay Removal in Basaltic and Limestone Horizontal Roughing Filters" authored by Stephen Rooklidge et al. Advance in Environmental Research, Elsevier publishing, 7 (2002) 231-237. The authors therein found that the clay could be removed with a series of four filters of decreasing size of calcite or dolomite.

The methods of this invention are also capable of removing mercury from water. This invention is capable of removing smectite clay and in some cases from any source of water, especially municipal water and seepage water.

EXAMPLES

The Wollastonite used in these examples was NYCOR® 100 purchased from NYCO, Willsboro, N.Y.

Example 1

A 1" diameter glass column packed with hand washed Wollastonite (Nycor-100). The column was packed 8 inches deep. Columns packed with Captech 10-250, a polymeric material produced by the methods set forth in the aforementioned patent application, were set up to accept the water that passed through the Wollastonite column. Two columns of the Captech 10-250 were used. Captech 10-250 is a material that is 10 percent by weight of polyethyleneimine polymer on 250 micron silica.

The test consisted of flowing many feed pails of smectite containing water through the three inline columns and measuring flow rate, pressure, low level mercury, and physical changes.

The Wollastonite successfully removed the smectite clay found in the waste water. Using Wollastonite filters in front of the Captech materials made it possible for the Captech material to operate in a normal fashion without plugging. It was possible to backwash the Wollastonite and remove the clay so that the method would allow the re-use of the Wollastonite many times.

Example 2

Clay Removal

Wollastonite Versus Bag Filter and Sand

To compare the effectiveness of Wollastonite to a filter bag As a filtration medium to remove clay from water.

The experiment consisted of using a clay feed through a 5 micron filter bag then through a single column filled with a material Capture 10-250. The pump feed tube was inside the filter bag, which was inside the clay enriched water. This made it possible to test. Flow rates were consistent at 7 minutes/1 liter at 17.5% pump flux with a quick pressure rise within the first 10 minutes to 3.6 psi, but then steadied to 2 psi for the remainder of the run. A yellow/green band formed on the Captech column and quickly traveled down the column, suggesting that some fine clay particles were making it through the filter bag. After just 90 minutes, the bag had formed a thick brown layer on the outside, which would no longer let any water into it and it had to be shut down. A total of 14 liters was filtered before the bag plugged up.

This experiment shows that the filter bag did work for a short period of time before plugging up, but it also allowed many fine clays through onto the Captech. Using a filter bag upfront would be a poor replacement for the Wollastonite but could be used in conjunction with the same. The results can be found on Table I.

TABLE I

| run # | product | % Tclay | % T upfront treat | % Tcap. treat | Gal. treated | Result |
|---|---|---|---|---|---|---|
| 4.0 | Captech only | 80.0 | NA | 98+ | 7.50 | Cap. Plugged |
| 4.1 | Nycor + Captech | 82.8 | 88.6 | 97.2 | 55+ | Excellent |
| 5.0 | filter bag + Captech | 80.9 | 83.7 | 98.9 | 3.75 | Bag clogged |
| 6.0 | sand + Captech | 81.2 | 93.0 | 99.4 | 3.80 | Cap. plugged |

T = transmittance

Example 3

To show that Wollastonite is a better pre-filter than simple sand to remove the clay particles.

A twin column was set up and was tested with clay feed as in the previous example. The twin columns consisted of a 2.5 inch Captech 10-250 lot #2880 drum #334 bed. About 10 liters of tap water was then flowed through to check flow conditions, which were normal at 7 minutes/liter with zero pressure at 17.5% pump flux. Some yellow color made its way onto the Captech, which was probably from the sand. The 80% transmission feed was then started and flowed through and shortly after, the white Captech surface began to get darker brown. After just 25 minutes, the pressure had both risen to 4.5 psi and the flow had started to decrease to 7.75 minutes/liter. The surface of the Captech was now a yellow/brown color and it was traveling down the column, which suggests something was getting through the sand bed. The transmission of the sand effluent was consistently around 90%, so it was filtering out some of the clay but not all. After 90 minutes, the flow had decreased to 10 minutes/liter and the pressures were up to 11 psi. Due to the poor flow and pressure the run was ended after just 14 liters had passed through. The sand does not seem to remove as many of the finer clay particles as does the Wollastonite, hence traveling onto the Captech quickly resulting in lower performance and shorter lifetime. Using a sand bed as a pre-filter to remove clay particles is not nearly as attractive as using a Wollastonite bed. Also, the sand is very likely to contain higher levels of mercury in it which would not be desirable to use on any mercury removal project. Thus, Wollastonite removes mercury from water.

TABLE II

| Sample | sample I.D. | Hg (ppt) | Hg removal % |
|---|---|---|---|
| Feed #1 | Q113.1 | 7.85 | |
| End pail #1 | Q113.2 | 4.42 | 43.7 |
| Feed #2 | Q113.3 | 8.53 | |
| End pail #2 | Q114.1 | 6.49 | 23.9 |

Example 4

A column having the dimensions of 2 inches by 3 inches was packed with Captech 10-250, lot MR-3112, a second column, 2 inches by 3⅛ inches was packed with dolomite limestone to demonstrate how the smectite clay would influence the flow and pressure in order to compare it with the Wollastonite performance. The target clay feed transmission was 80 to 85%. It was mixed in a 5 gallon pail. The feed was then remixed with a paint mixer every 5 to 10 minutes to keep the feed as consistent as possible. The flow rate and pressure were recorded frequently. Light transmission measurements were also taken frequently at both the limestone and the Captech columns.

Flow and pressures were measured and the twin columns had a good flow rate of about 8 minutes at the end of the four hour run. The pressures were 15 psi and 3.5 psi, respectively, before stopping the procedure. A total of 10 gallons was filtered, in which the limestone took some clay particles out to protect the Captech media but quickly plugged up causing very high pressures.

Brown color from the feed did make its way onto the Captech, but it did not affect the flow rate. Transmission measurements were very similar to that experienced by the this experiment showed that the limestone did help filter out some of the clay particles but was easily plugged after just 10 gallons. The Captech alone can treat up to 7.5 gallons before it plugs, so having the limestone upfront really didn't prolong treatment much. Some particles did get through the limestone bed as some brown color built up on the Captech just as they do with the Nycor. The limestone has two major disadvantages compared with using Wollastonite as a pre-filter, (1) the limestone requires lots of backwashing before use and (2) it builds up pressure over time, which is not attractive in practice. The results can be found in tables III, IV, and v.

TABLE III (first pail)

| Flow Rate | P1 (psi) | P2 (psi) | % T Feed | % T Limestone | % T Captech |
|---|---|---|---|---|---|
| 7'50" | 2.0 | 0 | 83.6 | 93.6 | 98.5 |
| 7'50" | 2.5 | 0 | | 91.9 | 98.5 |
| 8'10" | 4.0 | 0 | | 90.4 | 98.6 |

TABLE IV (second pail)

| Flow Rate | P1 (psi) | P2 (psi) | % T Feed | % T Limestone | % T Captech |
|---|---|---|---|---|---|
| 8'05" | 4.0 | 0 | 83.5 | | |
| 8'05" | 5.5 | | | 88.3 | 97.9 |
| 8'00" | 6.5 | 2.5 | | 86.3 | 97.9 |
| 8'05" | 8.0 | 3.5 | | 88.9 | 98.2 |
| | 15 | 3.5 | | | |

| Time | pail | flow rate | P1 (psi) | P2 (psi) | % T feed | % T limestone | % Captech |
|---|---|---|---|---|---|---|---|
| 13:00 | Start1 | 7'50" | 2.0 | 0 | | | |
| 13:15 | 1 | | | | 83.6 | 93.6 | 98.5 |
| 14:00 | 1 | 7'50" | 2.5 | 0 | | 91.9 | 98.5 |
| 15:00 | 1 | 8'10" | 4.0 | 0 | | 90.4 | 98.6 |
| 15:10 | stop | | | | | | |
| 11:20 | start2 | 8'05" | 4.0 | 0 | 83.5 | | |
| 12:10 | 2 | 8'05" | 5.5 | 1.0 | | 88.3 | 97.9 |
| 12:40 | 2 | 8'00" | 6.5 | 2.5 | | 86.3 | 97.9 |
| 13:20 | 2 | 8'05" | 8.0 | 3.5 | | 88.9 | 98.2 |
| 13:28 | end 2 | | 15 | 3.5 | | | |

Example 5

A dolomite limestone column and a Wollastonite column were packed to demonstrate how the smectite clay would influence the flow and effluents would be collected and kept to get data on what was getting through. The target clay feed transmission was 80 to 85% and was mixed in a 5 gallon pail that fed both columns simultaneously. The feed was then remixed with a paint mixer every 5 to 10 minutes to keep the feed as consistent as possible. The flow rate and pressures were recorded frequently. Light transmission measurements were also taken frequently at both exiting the limestone and exiting the Wollastonite sites. The limestone was filthy dirty and it seemed to break into smaller pieces very easily. The columns were backwashed and both the Wollastonite and limestone were flowing at the same rate of 12 minutes/1 L with tap water with pretty good effluent light transmission of 92 to 94%. The columns were flushed with tap water for one hour and had no flow variation or pressure build up. After just one hour of using the 80% clay feed, the limestone began to plug. The flow diminished as the pressure increased, while the Wollastonite did not change. The limestone column had to be stopped after running for 105 minutes due to high pressure, while the Wollastonite did not build up any pressure throughout its 220 minute run. Wollastonite is a much better option to use as a pre-filter for smectite clay removal. The results can be found on TABLE V.

TABLE V

| Time | pail | column | Flow rate 1L | P1 (psi) | % T Feed | % T Limestone | % T Captech |
|---|---|---|---|---|---|---|---|
| 10:20 | tap H$_2$O | A | 11'50" | 0 | | 98.7 | 98.4 |
| | | B | 11'40" | 0 | | | |
| 10:30 | Clay | A | 11'55" | 0 | | 98.3 | 93.0 |
| | | B | | 0 | | | |
| 11:30 | | A | 15'05" | 5.5 | | 98.0 | 92.4 |
| 12:15 | | A | 21"05" | 10 | 82.9 | 97.8 | 83.5 |
| | Feed 2 | B | 11'45" | 0 | 69.9 | | 83.5 |
| 13:30 | | B | 11'40" | 0 | | | 83.3 |
| 14:10 | | B | 11'30" | 0 | | | 85.0 |

What is claimed is:

1. A method of removing smectite clay from water, the method comprising:
    a. providing a flow of water containing smectite clay through a vessel containing Wallastonite;
    b. contacting said flow of water containing smectite clay with said Wollastonite to remove the smectite clay from the water.

2. The method as claimed in claim 1 wherein the water source is seepage water.

3. The method as claimed in claim 1 wherein the water is municipal water.

4. A method of removing smectite clay from water, the method comprising:
    mixing water containing a predetermined amount of smectite clay with a predetermined amount of Wollastonite to remove the smectite clay from the water; and
    filtering the mixture to remove said smectite clay and said Wollastonite from said water.

* * * * *